(12) United States Patent
Shinbo et al.

(10) Patent No.: US 7,864,420 B2
(45) Date of Patent: Jan. 4, 2011

(54) SCREEN (75) Inventors: Akira Shinbo, Shiojiri (JP); Hiroyuki Shindo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 269 days.

(21) Appl. No.: 12/172,808

(22) Filed: Jul. 14, 2008

(65) Prior Publication Data
US 2009/0021828 A1 Jan. 22, 2009

(30) Foreign Application Priority Data

Jul. 20, 2007 (JP) ............................. 2007-189156
Jun. 2, 2008 (JP) ............................. 2008-144381

(51) Int. Cl.
*G03B 21/60* (2006.01)
(52) U.S. Cl. ..................................... 359/459
(58) Field of Classification Search ......... 359/454–456, 359/459
See application file for complete search history.

(56) References Cited

U.S. PATENT DOCUMENTS

| | | | | |
|---|---|---|---|---|
| 4,297,001 | A * | 10/1981 | Antes et al. | 359/459 |
| 4,490,010 | A * | 12/1984 | Honda et al. | 359/456 |
| 4,732,441 | A * | 3/1988 | Cheng | 359/451 |
| 6,275,334 | B1 | 8/2001 | Park | |
| 6,317,263 | B1 | 11/2001 | Moshrefzadeh et al. | |
| 7,239,445 | B2 * | 7/2007 | Pouslen | 359/459 |
| 7,453,637 | B2 | 11/2008 | Taira et al. | |
| 7,570,423 | B2 * | 8/2009 | Willard | 359/459 |
| 2003/0210462 | A1 * | 11/2003 | Freese et al. | 359/455 |
| 2006/0215260 | A1 | 9/2006 | Taira et al. | |
| 2008/0043327 | A1 * | 2/2008 | Allen et al. | 359/459 |
| 2009/0059365 | A1 * | 3/2009 | Rickers et al. | 359/459 |
| 2009/0080071 | A1 | 3/2009 | Taira et al. | |
| 2009/0161074 | A1 * | 6/2009 | Shinozaki et al. | 353/30 |

FOREIGN PATENT DOCUMENTS

| | | |
|---|---|---|
| CN | 2280931 Y | 5/1998 |
| CN | 1055770 C | 8/2000 |
| CN | 1837946 A | 9/2006 |
| JP | A-57-38427 | 3/1982 |
| JP | A-57-169739 | 10/1982 |
| JP | A-10-39417 | 2/1998 |
| JP | A-11-142975 | 5/1999 |
| JP | A-2006-65266 | 3/2006 |
| JP | A-2006-215162 | 8/2006 |

* cited by examiner

*Primary Examiner*—Christopher Mahoney
(74) *Attorney, Agent, or Firm*—Oliff & Berridge, PLC (57) ABSTRACT A screen includes plural three-dimensional portions having a concave shape arranged at a front surface side of a screen substrate, wherein the three-dimensional portions are disposed so that the number of the three-dimensional portions provided in a range of a given length along a first direction on the screen substrate which is determined corresponding to at least either one of a direction of a chief ray and a chief direction of outside light is larger than the number of three-dimensional portions provided in a range of the given length along a second direction crossing the first direction and in which the plural three-dimensional portions are arranged so that at least two three-dimensional portions of the three-dimensional portions provided in the range of the given length along the first direction contact each other.

12 Claims, 9 Drawing Sheets

SCREEN

BACKGROUND

1. Technical Field

The invention relates to a screen on which a projected image is projected by reflecting projection light from a projection apparatus such as a projector placed in front.

2. Related Art

For example, as a reflective screen reflecting a projected image by oblique projection from below to be observed, a high-contrast screen is known, in which a large number of convex unit shape portions having the same shape are two-dimensionally disposed on a screen substrate regularly, and a reflection surface is formed only at a surface portion of a lower side to shield outside light from above (refer to JP-A-2006-215162)

However, in the case that the reflection surface is formed only at the surface portion of the lower side of convex unit shapes formed on the screen substrate, when projection light is reflected at a wide angle on a screen surface, light intensity with respect to a specific direction may not be sufficiently obtained, though a angle of view becomes wide. For example, as a result of allowing the angle of view to be too wide, light intensity with respect to a direction of a viewer of the screen may not be sufficient and may be a dark screen having low front gain. In addition, in a bright room and the like, the lowering of contrast of a projected image may not be sufficiently suppressed due to the effect by illumination light and the like.

SUMMARY

An advantage of some aspects of the invention is to provide a bright screen in which the decrease of front gain is suppressed as well as capable of improving contrast of a projected image in a bright room and the like such as a room having outside light from above.

According to an aspect of the invention, a first screen (a) includes plural three-dimensional portions having a concave shape arranged at a front surface side on a screen substrate, wherein (b) the three-dimensional portions are disposed so that the number of three-dimensional portions provided in a range of a given length along a first direction on the screen substrate which is determined corresponding to at least either one of a direction of a chief ray and a chief direction of outside light is larger than the number of three-dimensional portions provided in a range of a given length along a second direction crossing the first direction, and (c) the plural three-dimensional portions are arranged so that at least two three-dimensional portions of the three-dimensional portions provided in the range of the given length along the first direction contact each other.

According to an aspect of the invention, a second screen (a) includes plural three-dimensional portions having a convex shape arranged at a front face side on a screen substrate, in which (b) the three-dimensional portions are disposed so that the number of three-dimensional portions provided in a range of a given length along a first direction on the screen substrate which is determined corresponding to at least either one of a direction of a chief ray and a chief direction of outside light is larger than the number of three-dimensional portions provided in a range of a given length along a second direction crossing the first direction, and (c) at least two three-dimensional portions of three-dimensional portions provided in the range of the given length along the first direction are arranged so as to contact each other.

In the first and second screen, the three-dimensional portion may be both a protrusion protruding from the surface of the screen substrate and a concave portion receding from the surface of the screen substrate. The three-dimensional portion is not limited to the one demarcated by other curved surfaces of a spherical surface but includes the one demarcated by a surface having a flat surface at a part thereof. The chief ray is the one in a case that luminous flux incident to a focused region on the screen is considered, and usually it is the one concerning luminous flux incident to the central region on the screen, however, it may be the one concerning luminous flux incident to a desired region or the whole region on the screen. Concerning the arrangement of plural three-dimensional portions, the fact that the number of three-dimensional portions provided in the range of the given length along the first direction is larger than the number of portions provided in the range of the given length along the second direction crossing the first direction means that an occupation rate or density of three-dimensional portions is higher in the first direction than in the second direction. When the occupation rate or density of the three-dimensional portions is higher in the first direction than in the second direction, an arrangement in which there is no flat portion between three-dimensional portions adjacent to one another in the second direction and three-dimensional portions concerning both the first and second directions contact one another may be applied.

In the above screen, plural three-dimensional portions make lines along the first direction on the screen substrate so that plural lines are provided in the second direction crossing the first direction. Further, in the same line along the first direction, at least two three-dimensional portions are disposed so as to contact each other. At this time, the three-dimensional portions are arranged so that the number of three-dimensional portions provided within a range of a given length along the first direction is larger than the number thereof provided within a range of the given length along the second direction crossing the first direction. Accordingly, for example, projection light from the projection apparatus and the like whose chief ray is in a surface vertical to the first direction and in a direction inclined to the screen can be reflected more at the front of the screen which is the observer's side, as a result, the decrease of the front gain can be suppressed to brighten the projected image. In addition, for example, reflection of outside light from a direction different from the direction of the chief ray of the projection light, particularly the outside light whose incident angle is smaller than the chief ray can be suppressed, as a result, contrast can be improved even when used in a bright room.

As a specific aspect of the invention, at least part of plural three-dimensional portions forms a group in which basic shapes are connected to one another by being overlapped. Accordingly, more light can be reflected to the observer's side positioned in front of the screen. Here, the basic shape means a three-dimensional shape such as a hemisphere, an oval hemisphere, and contours thereof in plan view are arranged so as to overlap one another, thereby forming a group in which protrusions or convex portions connected closely to one another.

As a specific aspect of the invention, at least part of plural three-dimensional portions is arranged so that adjacent three-dimensional portions contact one another in the same line along the first direction. Accordingly, an angle of view having a wide range can be obtained.

As a specific aspect of the invention, at least parts of plural three-dimensional portions are apart from one another for a given interval with respect to the second direction. Since they are separated for a given interval, a flat portion is secured between three-dimensional portions in the second direction. For example, when the chief ray is in the surface vertical to the first direction and in the direction inclined to the screen surface, the reflection of projection light is not reduced so much as well as the reflection of outside light from the direction other than the projection light at the front of the screen is suppressed, thereby improving contrast appropriately.

As a specific aspect of the invention, the first direction is a direction of an intersection line between the surface vertical to the chief ray of the projection light and the screen surface. Accordingly, the screen has a structure corresponding to the projection direction of the projection light from the projection apparatus such as a projector.

As a specific aspect of the invention, the first direction is the horizontal direction. Accordingly, for example, projection light projected from a lower direction can be reflected efficiently to the front direction as well as outside light by illumination light and the like from above can be prevented from being reflected to the front side.

As a specific aspect of the invention, the second direction is the vertical direction. Accordingly, for example, when projection light is projected from below vertically while outside light such as illumination light is illuminated from above vertically, contrast can be improved efficiently.

As a specific aspect of the invention, the first direction and the second direction cross orthogonally. Accordingly, for example, when projection light and outside light are generated from different directions such that the projection light from the projection apparatus is generated from below and the outside light such as illumination light is generated from above, a bright and high-contrast image can be projected efficiently.

As a specific aspect of the invention, the flat portion can be provided between plural three-dimensional portions on the side of the screen substrate. In this case, for example, plural three-dimensional portions include a light reflection surface and a light absorption surface, a boundary between the light reflection surface and the light absorption surface is parallel to the first direction, and the flat portion can includes the absorption surface of light. Accordingly, the light reflection surface can reflect projection light appropriately as well as the light absorption surface of plural three-dimensional portions and the absorption surface of light in the flat portion absorb unnecessary light such as outside light appropriately, as a result, contrast can be improved suitably.

As a specific aspect of the invention, plural three-dimensional portions include the light absorption surface in the vicinity of the light reflection surface. Accordingly, unnecessary light such as outside light can be appropriately absorbed even in the vicinity of the light reflection surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figures 1A, 1C:
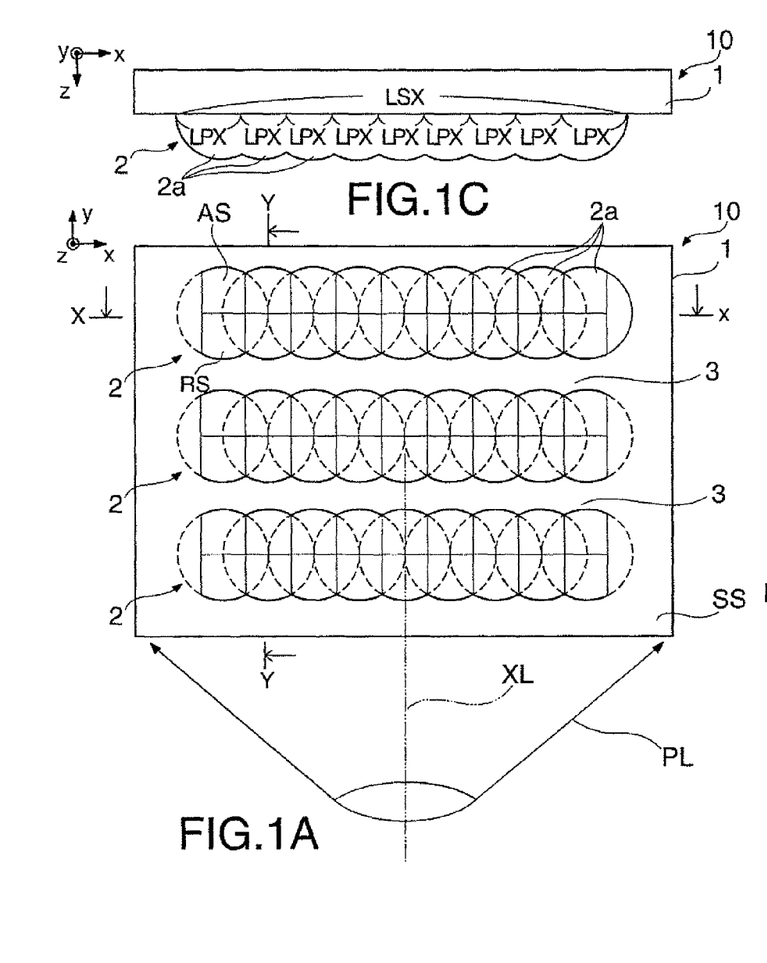
FIG. 1A to FIG. 1C are views schematically showing a screen according to a first embodiment.
Figure 1B:
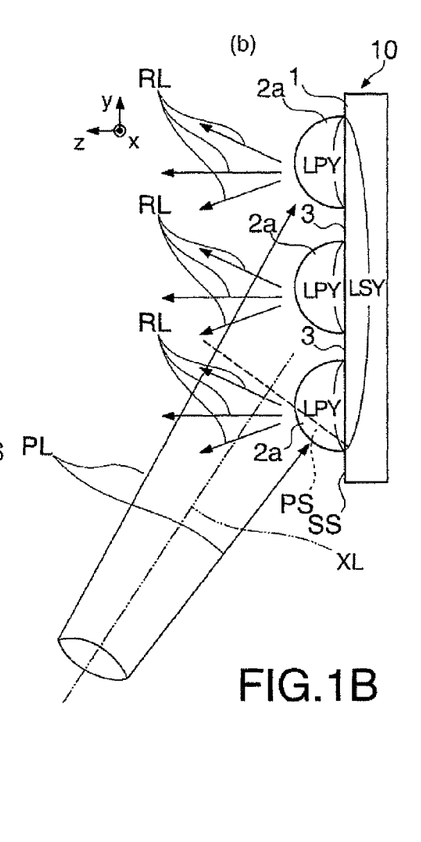

Hereinafter, a screen according to an embodiment of the invention will be explained with reference to the drawings. FIG. 1A to FIG. 1C are views schematically showing a screen according to the embodiment. FIG. 1A is a front view of the screen, FIG. 1B is a Y-Y side cross-sectional view and FIG. 1C is an X-X plan cross-sectional view. A screen 10 is a reflective screen in which projection light PL from a not-shown projection apparatus installed in front of the screen at a lower position is reflected as reflected light RL more at the front side of the screen 10. The screen 10 according to the embodiment includes a screen substrate 1 and plural lines of groups (protrusion groups) 2 formed by plural protrusions 2a being arranged side by side on the screen substrate 1. A surface portion where the screen substrate 1 is exposed at the front side functions as a flat portion 3 positioned between plural protrusions 2a. that is, between plural lines of groups 2.

As shown in FIG. 1A, each of plural protrusions 2a formed at the front surface side on the screen substrate 1 respectively has an almost hemispherical outline as each of plural three-dimensional portions. The plural protrusions 2a are arranged so that plural lines in the horizontal direction, namely, in the x-direction in the drawing on the screen substrate 1 are provided in the vertical direction, namely, in the y-direction in the drawing. One line is a group 2 in which protrusions 2a adjacent in the x-direction contact one another so as to overlap one another. That is, each protrusion 2a is a hemisphere as a basic shape, and a circle which is a contour of the hemisphere in plain view is arranged so as to overlap one another in the x-direction, as a result, the group 2 in which protrusions are arranged side by side is formed. Therefore, a cross-sectional shape when cutting the group 2 in the x-direction is a pedestal shape having plural arcs being connected as shown in FIG. 1C. On the other hand, as shown by FIG. 1B and the like, plural groups 2 are regularly arranged apart from one another in the vertical direction, namely, in the y-direction, and the flat portion 3 is formed between plural protrusions 2a.

As described above, in the front face side as the reflection surface of the screen 10, plural protrusions 2a contact so as to overlap one another in the x-direction, therefore, the surface of each protrusion 2a has a shape in which both ends of the hemisphere in the x-direction are cut, which enables the projection light PL from the projection apparatus installed in front of the screen 10 at the lower position to be reflected more in front of the screen as the reflected light RL. Accordingly, the decrease of the front gain can be suppressed to obtain a bright screen. In addition, the protrusions 2a are apart from one another at predetermined intervals in the y-direction, therefore, an occupied region of the flat portion 3 in the y-direction can be secured and outside light from upper front of the screen 10 can be shielded, which enables proper improvement of contrast.

In the case of the screen 10 shown in FIG. 1A to FIG. 1C, a specific arrangement considering the occupation rate of the protrusions 2a concerning later-described respective directions is performed, allowing the horizontal direction, namely, the x-direction in which protrusions 2a overlap one another on the screen substrate 1 to be a first direction, and allowing the vertical direction, namely, the y-direction crossing the first direction vertically to be a second direction. These first and second directions are determined so as to correspond to the direction of the chief ray XL of the projection light PL or the chief direction of outside light such as illumination light, taking the focused region on the screen 10 (specifically, the central region on the screen 10) as a reference.

The occupation rate of the protrusions 2a indicates an index showing the rate of occupation by the protrusions 2a on the screen substrate 1 concerning the arrangement direction, meaning that the number of three-dimensional shapes formed at each unit length (given length) in the arrangement direction. When explaining in line with the embodiment, the occupation rate is the rate of the width of a cross-section of protrusions 2a occupied in an available area of an image on the screen substrate 1 in a cross-section of a position where the width of the cross-section of protrusions 2a is largest with respect to the first direction or the second direction. For example, with respect to the second direction (y-direction) extending vertically, the rate in which the sum of the width of a cross-section LPY of each protrusion 2a occupies a length LSY of the available area of the image on the screen substrate 1 in the Y-Y side cross-section shown in FIG. 1B which is the cross section of the position where the width of the cross-section of protrusions 2a is largest in the second direction is the occupation rate of the plural protrusions 2a on the screen substrate 1 in the second direction. Similarly, with respect to the first direction (x-direction) extending horizontally, the rate in which the sum of the width of a cross-section LPX of each protrusion 2a occupies a length LSX of the available area of the image on the screen substrate 1 in the X-X plan cross-section shown in FIG. 1C which is the cross section of the position where the width of the cross-section of protrusions 2a is largest in the first direction is the occupation rate of the plural protrusions 2a on the screen substrate 1 in the first direction.

In the case of the screen 10 shown in FIG. 1A to FIG. 1C, plural protrusions 2a are disposed so as to overlap one another in the first direction without gaps, whereas in the second direction, they are arranged apart from one another. Therefore, the occupation rate of plural protrusions 2a in the horizontal first direction is higher than the occupation rate of plural protrusions 2a in the vertical second direction. In short, plural protrusions 2a are arranged in a closer state in the first direction as compared with the second direction. In addition, in the arrangement shown in FIG. 1A to FIG. 1C, plural protrusions 2a contacts so as to overlap one another as they are close for less than the radius of the basic shape, therefore, the surface which reflects light has a shape in which each hemisphere is cut at both side end portions as shown in FIG. 1C. Accordingly, the projection light PL, for example, from below is allowed to be reflected toward the front central direction which is the observer's side (namely, positive z-direction) more than the front outer direction of the screen 10, which is described in detail later. Further, center points of plural protrusions 2a are arranged on lattice points, and at this time, the occupation rate of the second direction is lower than the occupation rate of the first direction, particularly, protrusions are arranged apart from one another in the second direction and the occupation area of the flat portion 3 can be secured, as a result, the improvement of contrast can be realized even under bright luminance.

Next, the relation between a direction of the chief ray XL of the projection light PL from a projection apparatus in the case that image projection is performed by the projection apparatus (not shown) such as a projector as well as a direction of outside light such as luminance light which is unnecessary for the image projection and the screen 10 will be explained, thereby explaining characteristics of the above screen 10 in more detail. In the using manner of the projection apparatus such as a common projector in the room, the projection apparatus is set on the floor, namely, in the lower side, and projection is performed from below to the upward direction. On the other hand, lighting equipment which illuminate the interior is set on the ceiling side, therefore, outside light such as illumination light illuminates the interior from above in many cases. The embodiment is an example of a case in which the reflection surface of the screen 10 is formed in advance so as to correspond to common using environment of the screen 10. Therefore, in the embodiment, the chief ray XL which is incident to the focused central region of the screen 10 is inclined downward in the oblique direction with respect to the normal line extending from the center of the screen 10 on the assumption that the oblique projection is performed from the lower direction of the screen 10 to the upward direction as shown in FIG. 1A and FIG. 1B. In this case, as shown in FIG. 1B, the x-direction which is the direction of an intersection line between a surface PS which is vertical to the chief ray XL of the projection light PL and a screen surface SS on the screen substrate 1, that is, the horizontal direction will be the first direction. The chief direction of outside light by the light equipment is the direction of almost line symmetry to the chief ray XL with respect to the normal line of the screen surface SS.

Figure 2:
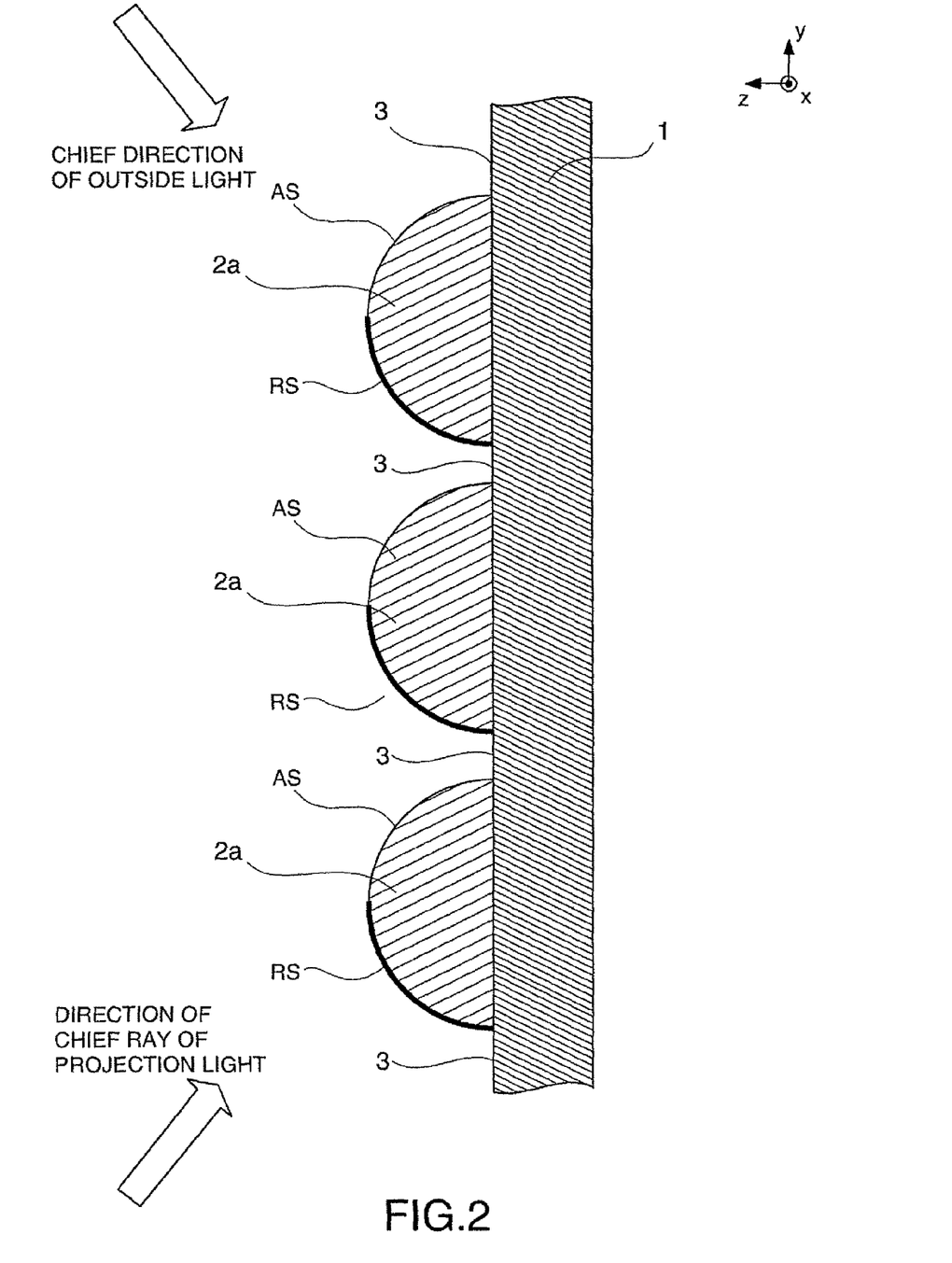
FIG. 2 is a sectional side view in which part of the screen according to the first embodiment is enlarged.

FIG. 2 is a view for explaining in detail a structure of a reflection surface of the screen 10, which is the view obtained by enlarging FIG. 1B. Each of plural protrusions 2a has a light reflection surface RS and a light absorption surface AS respectively. The light absorption surface AS is formed by coating, for example, a light-absorbent material on the surface. As described above, the direction of the chief ray XL concerning the projection light PL is from the lower direction, whereas, the chief direction of outside light by luminance equipment and the like is from the upper direction which is the direction of the almost line symmetry to the chief ray XL with respect to the normal line of the screen surface SS. Corresponding to this, the light reflection surfaces RS of plural protrusions 2a are provided at the lower side and the light absorption surfaces AS are provided at the upper side. In other words, boundaries between the light reflection surfaces RS and the light absorption surfaces AS of the protrusions 2a are parallel to the first direction. Accordingly, the projection light XL which should be projected from the lower direction is efficiently reflected, while outside light by light equipment and the like from the upper direction which should not to be reflected is allowed to be absorbed in the screen 1. In this case, the flat portion 3 is also formed by coating a light-absorbent material, for example, on the surface in the same manner as the light absorption surface AS. The flat portion 3 is formed by the groups 2 being apart at predetermined intervals in the vertical direction, namely, in the second direction. According to the structure, projection light from the lower direction is not incident to the flat portion 3, being reflected by the protrusions 2a provided under the flat portion 3, and outside light with relatively small incident angle from above is incident. Even in a bright place where effect of outside light by light equipment and the like is significant, outside light is hardly reflected in front of the screen 10 due to the existence of the light absorption surfaces AS and the flat portion 3, as a result, projection of images having high-contrast with deep black can be realized.

In the manufacture of the screen 10, a method of forming convex portions to be plural protrusions 2a can be variously considered, for example, a method in which a mold corresponding to the shape of convex portions is manufactured by a photolithography process and an etching process, a raw material such as a resin is press-processed, injection-molded by using the mold to form the convex portions on the screen substrate 1 can be considered. As another method, for example, a method of forming dots by an ink-jet system so as to be a given reflection surface on the screen substrate 1 can be also considered. Specifically, a method in which a raw material in a liquid-state is sprayed on the screen substrate 1 so as to be a given dot-state and the sprayed raw material is solidified on the screen substrate 10 to form convex portions can be considered. Concerning to the formation of the light reflection surfaces RS on plural protrusions 2a. for example, an aluminum metal as a reflection material is deposited on a specific region of the convex portions formed as described above, or the reflection material is sprayed by a spray from a specific direction to form the light reflection surfaces RS only at an intended region, corresponding to the direction of projection light and the like. In the above explanation, a light-absorbent material is, for example, coated on the surface of the flat portion 3 and the light absorption surfaces AS, however, it is also preferable that a light-absorbent material is used as a raw material itself to be used for the screen substrate 1 and the spherical portions corresponding to plural protrusions 2a.

Figure 3A:
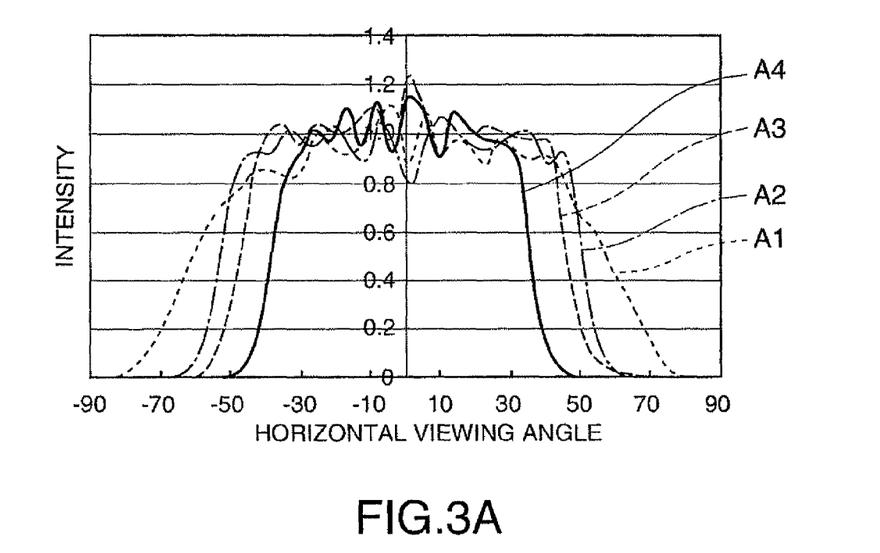
FIG. 3A and FIG. 3B are graphs explaining characteristics of the screen.
Figure 3B:
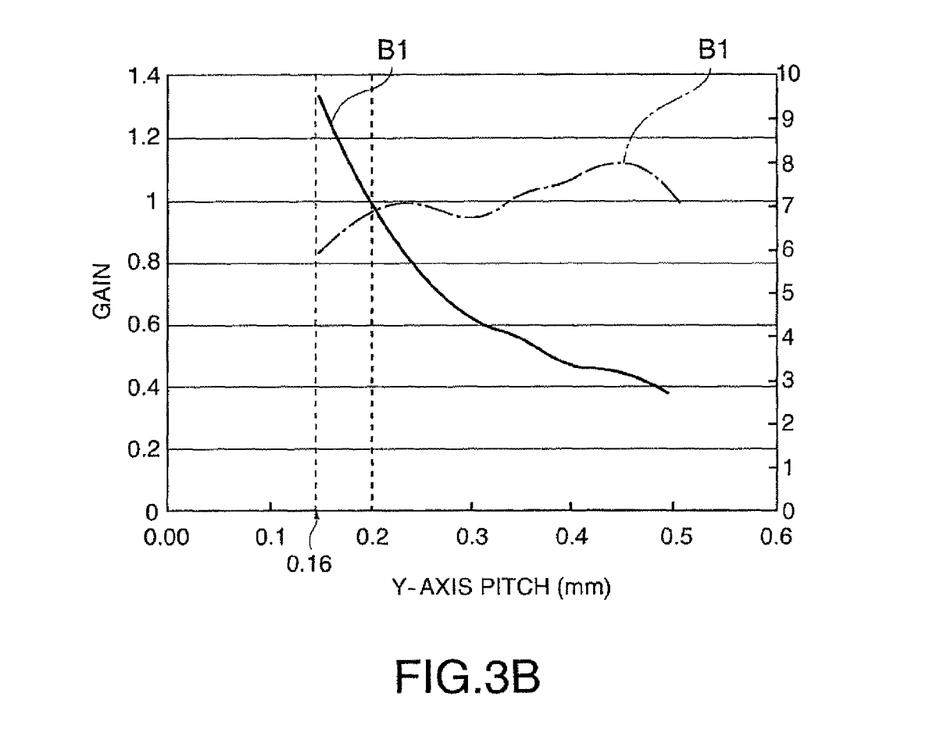

FIG. 3A and FIG. 3B are graphs for explaining characteristics of the screen formed as described above. As one of them, FIG. 3A is a graph showing the relation between an arrangement of protrusions 2a in the horizontal direction as the first direction in the embodiment, namely, the overlapping degree of the protrusions 2a with respect to the first direction and the light intensity with respect to a horizontal angle of view.

Figure 4A:
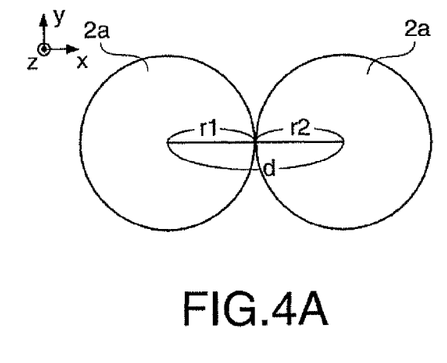
FIG. 4A to FIG. 4E are views explaining the positional relationship of adjacent protrusions.
Figure 4B:
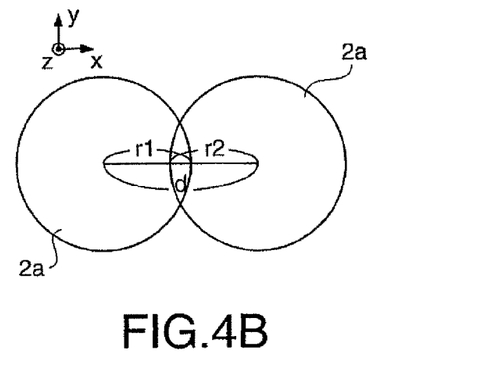

Concerning FIG. 3A, the horizontal axis denotes the horizontal angle of view, and the vertical axis denotes the light intensity. Respective curves A1 to A4 are graphs showing cases in which the overlapping degree of protrusions 2a with respect to the first direction shown in FIG. 1A to FIG. 1C is varied. For example, the curve A1 in the curves A1 to A4 shows the light intensity with respect to the horizontal angle of view in the case that protrusions 2a adjacent to one another in the first direction do not overlap and are arranged at intervals in which protrusions 2a just contact one another on the screen surface SS in FIG. 1A and the like. That is, the curve A1 shows numeral values concerning the light intensity when plural protrusions 2a on the screen substrate 1 with respect to the first direction are arranged at equal intervals, namely, at equal pitches with respect to the first direction with a pattern shown in FIG. 4A being repeated. Here, FIG. 4A will be explained in detail. In this case, the basic shape of each protrusion 2a is an almost the same hemisphere, having a circular plane contour. An adjacent distance "d" which is the distance between centers of two protrusions 2a adjacent to each other with respect to the first direction is equal to the sum r1+r2 of radiuses r1, r2 of the two protrusions 2a. that is, two protrusions 2a contact each other on the screen surface SS. That is, d=r1+r2. In this case, the light reflection surfaces RS of protrusions 2a exist in the vicinity of the screen surface SS with respect to the first direction, therefore, as can be seen from the curve A1 shown in FIG. 3A, the intensity is maintained to some degree even when the horizontal angle of view is more than 50 degrees with respect to left and right, which is sufficient, however, the intensity is low when the horizontal angle of view is within 10 degrees with respect to left and right. On the other hand, respective curves A2 to A4 show numeral values concerning light intensity in the case that a pattern in which the basic shapes (hemispheres) of two protrusions 2a adjacent with respect to the first direction as shown in FIG. 4B overlap each other is repeated at equal pitches. Specifically, in the case of the curves A2 to A4 in FIG. 3A, the adjacent distance "d" is smaller than the sum of two radiuses r1+r2, namely, d<r1+r2, respectively. In the case of the curve A2 in the curves A2 to A4, the adjacent distance "d" is the largest, that is, the overlapping degree of the hemisphere corresponding to the protrusion 2a is the smallest. The case of the curve A4 shows numeral values when the adjacent distance "d" is the smallest, that is, the overlapping degree of the hemisphere corresponding to the protrusion 2a is the largest.

It is conceivable that the larger the overlapping degree of the basic shape (hemisphere) forming the protrusion 2a. the smaller the angle of view is, by comparing respective curves A1 to A4 in FIG. 3A. However, in the case of the curve A4, the overlapping degree of the hemisphere corresponding to the protrusion 2a reaches almost the half of the hemisphere, and even in such a case, the angle of view is kept to approximately 40 to 50 degrees with respect to left and right though it is comparatively narrowed, which is sufficient angle of view as a normal projection image. Conversely, when the hemispheres corresponding to the protrusions 2a do not overlap and just contact each other as shown, for example, in the curve A1, some degree of angle of view can be obtained in a wide range, however, the light intensity to the specific direction such as in front of the screen where the observer is usually positioned is decreased. In the graph of FIG. 3A, the light intensity in the vertical axis shows normalized values, therefore, the difference of the light intensity between respective curves A1 to A4 is not distinct, however, the larger the angle of view is, the wider the angle at which light is reflected, therefore, the light intensity to the specific direction decreases. That is, when the angle of view is wide, gain decreases, for example, in front of the screen where the observer of the projection image is positioned, as a result, the image to be projected on the side of the observer becomes dark. In response to this, in the embodiment, for example, the screen 10 has a configuration shown in FIG. 1A to FIG. 1C, in which hemispheres corresponding to protrusions 2a overlap one another in the x-direction, both end portions of the spherical protrusion 2a in the first direction are not used as the light reflection surfaces RS, and the central portions of the spherical protrusions 2a in the first direction are connected as the light reflection surface RS. Accordingly, the projection light PL can be reflected more in front of the screen 10 at the vicinity of the center thereof which is the side of the observer. At this time, it is possible to keep the angle of view which is sufficient as a screen image (approximately 50 degrees to left and right, respectively) as shown in respective curves A2 to A4.

Next, FIG. 3B is a graph showing the relation between the arrangement of protrusions 2a with respect to the vertical direction which is the second direction in the embodiment, that is, the degree of separation of protrusion 2a in the second direction and the gain which is an index for the light intensity as well as the relation with respect to contrast. Hereinafter, explanation will be made on the assumption that the adjacent distances of all protrusions 2a adjacent with respect to the second direction are arranged at equal pitches, therefore, the adjacent distance of the protrusions 2a is determined by determined a value of the pitch.

In FIG. 3B, the horizontal axis shows the pitch in the y-axis direction of protrusions 2a (distance between centers of protrusions 2a adjacent in the y-axis direction) with respect to the vertical direction which is the second direction in FIG. 1A to FIG. 1C. That is, a value of the horizontal axis will be a value corresponding to the separation degree of protrusions 2a with respect to the second direction shown in FIG. 1A to FIG. 1C.

In addition, in respective curves B1, B2, a curve B1 shows the gain of light and a curve B2 shows contrast. The contrast in this case shows values under illumination of illuminance 100 lux.

FIG. 3B shows the graph when the screen has protrusions 2a. each having a hemispherical shape of 0.08 mm radius.

Figure 4C:
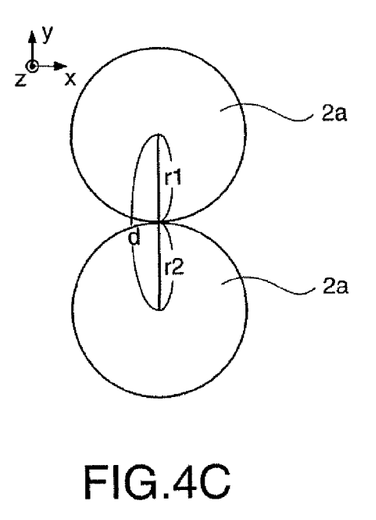
Figure 4D:
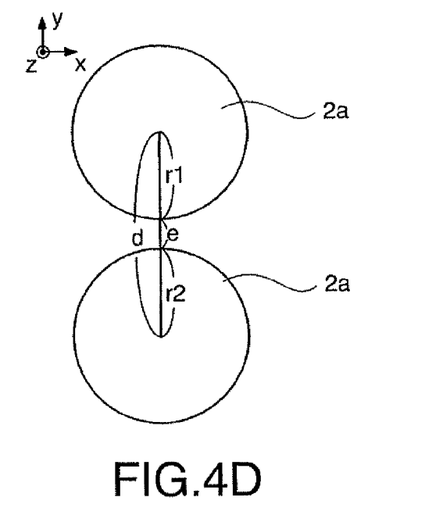

Concerning the horizontal axis of FIG. 3B, when the pitch value in the y-axis direction is 0.16 mm, the basic shapes (hemispheres) forming the protrusions 2a provided adjacent to each other in the second direction just contact on the screen surface SS without overlapping each other as shown in FIG. 4C. That is, in this case, the adjacent distance "d" corresponding to the pitch value in the y-axis direction is equal to the sum of radiuses of hemispheres r1+r2 corresponding to adjacent two protrusions 2a. namely, d=r1+r2. When the pitch value in the y-axis direction is larger than 0.16 mm, d>r1+r2 as shown in FIG. 4D. As the pitch value in the y-axis direction becomes larger than 0.16 mm, a separation distance "e" of adjacent protrusions 2a which is the difference between the adjacent distance "d" and the contact distance "r1+r2" becomes larger, too. As can be seen from curves B1, B2 in FIG. 3B, the larger the pitch value in the y-axis direction becomes, the larger the value of contrast becomes, however, the gain indicating the light intensity decreases, therefore, the gain and the contrast have the relation of trade-off. Specifically, as the separation distance "e" of the protrusions 2a in FIG. 4D becomes larger, the ratio of the flat portion 3 which absorbs light in the available area of the image on the screen substrate 1 becomes high, therefore, the reflection of outside light at the front of the screen 10 is suppressed to increase the contrast, as a result, the image in which black is deep can be obtained. However, the ratio of the light reflection surfaces RS of protrusions 2a in the available area of the image on the screen substrate 1 becomes lower, as a result, it becomes difficult that the projection light PL is reflected at the front of the screen 10, which makes the whole projection image to dark. Accordingly, in the case of FIG. 3B, for example, the pitch value in the y-axis direction is allowed to be approximately 0.40 mm to thereby form the high-contrast image while keeping some degrees of brightness.

In the case of the example shown in the embodiment, when the basic shape of all the protrusion 2a is a hemispherical shape of 0.08 mm radius, the hemispheres corresponding to the protrusions 2a overlap one another in a state in which the adjacent distance "d" shown in FIG. 4B is approximately half of the contact distance r1+r2 with respect to the horizontal direction to form the group 2. Concerning the vertical direction "y", plural protrusions 2a are allowed to be the arrangement in the optimum state by determining the pitch value in the y-axis direction to be approximately 0.40 mm.

Figure 4E:
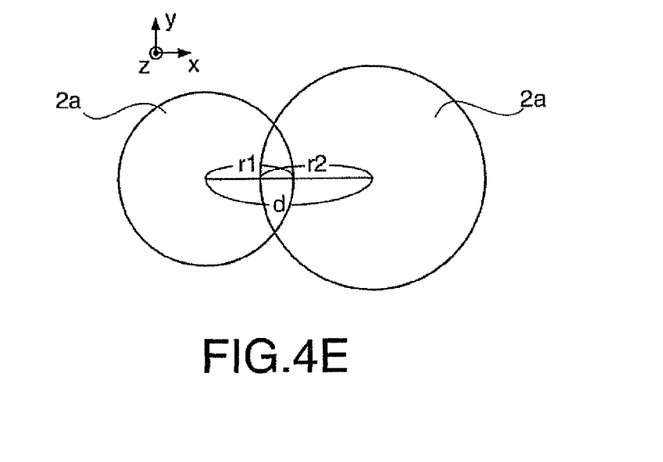

In the above explanation, the basic shape of the protrusions 2a in the drawing is almost the same hemispherical shape, however, it is not always necessary that the basic shape of the protrusions 2a has the same size, and for example, the respective radiuses r1, r2 may have different sizes as shown in FIG. 4E. It is also not always necessary that the contour of the basic shape is hemispherical, and it is preferable to apply other shapes such as an oval hemispherical shape if it can be manufactured. The number of arranging the protrusions 2a can be appropriately determined. For example, in FIG. 1A, one group 2 in which nine protrusions 2a having the same shape are arranged so that respective centers are put on a straight line parallel to the first direction, and so that adjacent protrusions 2a contact one another on the screen surface SS are disposed in three lines in the second direction, which shows the arrangement of the protrusions 2a on the screen substrate 1 schematically. The invention is not limited to this, and it is preferable that one group 2 is formed by a greater number of protrusions 2a. In the case, a greater number of the groups 2 can be arranged according to the available area and the like of the image on the screen 10.

Figure 5A:
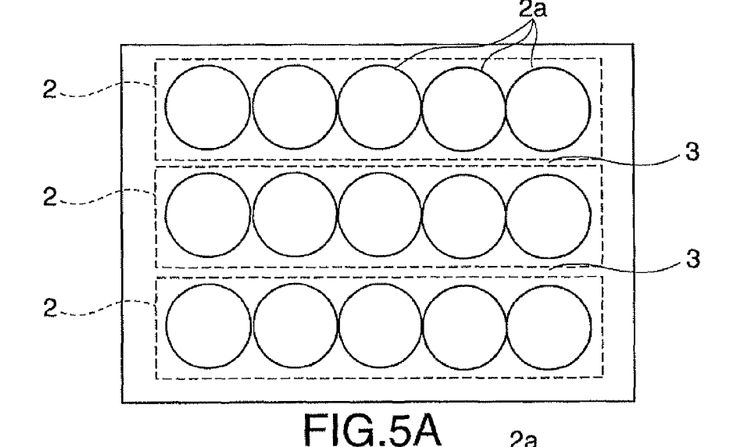
FIG. 5A to FIG. 5C are views showing another examples of the screen.
Figure 5B:
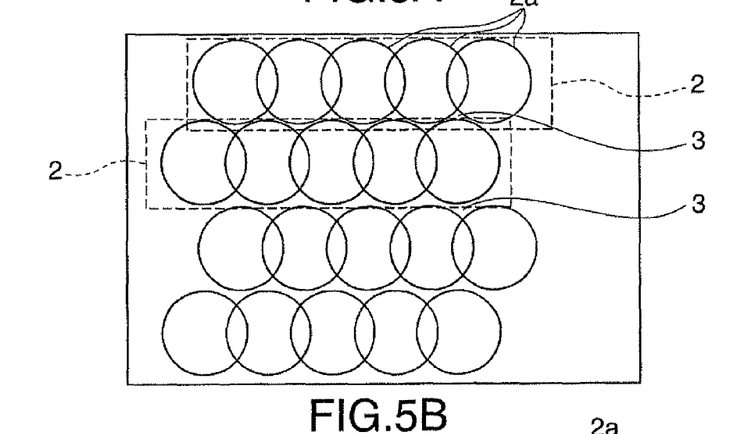
Figure 5C:
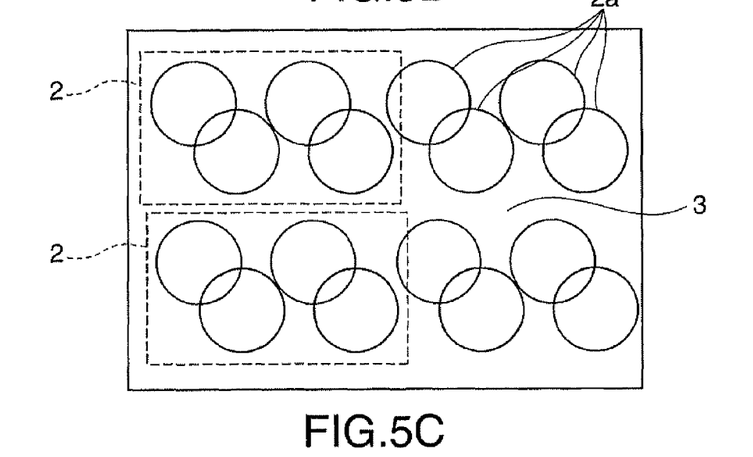

FIG. 5A to FIG. 5C show modification examples of the screen 10 according to the embodiment. For example, as shown in FIG. 5A, it is preferable that the basic shapes corresponding to the protrusions 2a are arranged so as to contact one another on the screen surface SS without overlapping one another with respect to the first direction horizontally extending. Also as shown in FIG. 5B, it is preferable that respective groups 2 in which plural protrusions 2a are arranged so that respective centers are put on a straight line parallel to the first direction, and end portions of the basic shapes corresponding to adjacent protrusions 2a are arranged so as to overlap one another in the first direction are disposed in plural lines in the second direction, in which adjacent lines are arranged so as to be shifted alternately in the horizontal first direction, thereby arranging the protrusions 2a more closely while securing the flat portion 3. Also as shown in FIG. 5C, it is preferable that respective groups 2 in which plural protrusions 2a are arranged so that the centers thereof are not arranged on a straight line parallel to the first direction in the same group 2 are formed in blocks forming lines extending along the first direction. Also in this case, an area in which groups are separated at given intervals between (especially, between up and down) the groups 2 in blocks in the vertical second direction are provided, thereby improving contrast.

Figure 6:
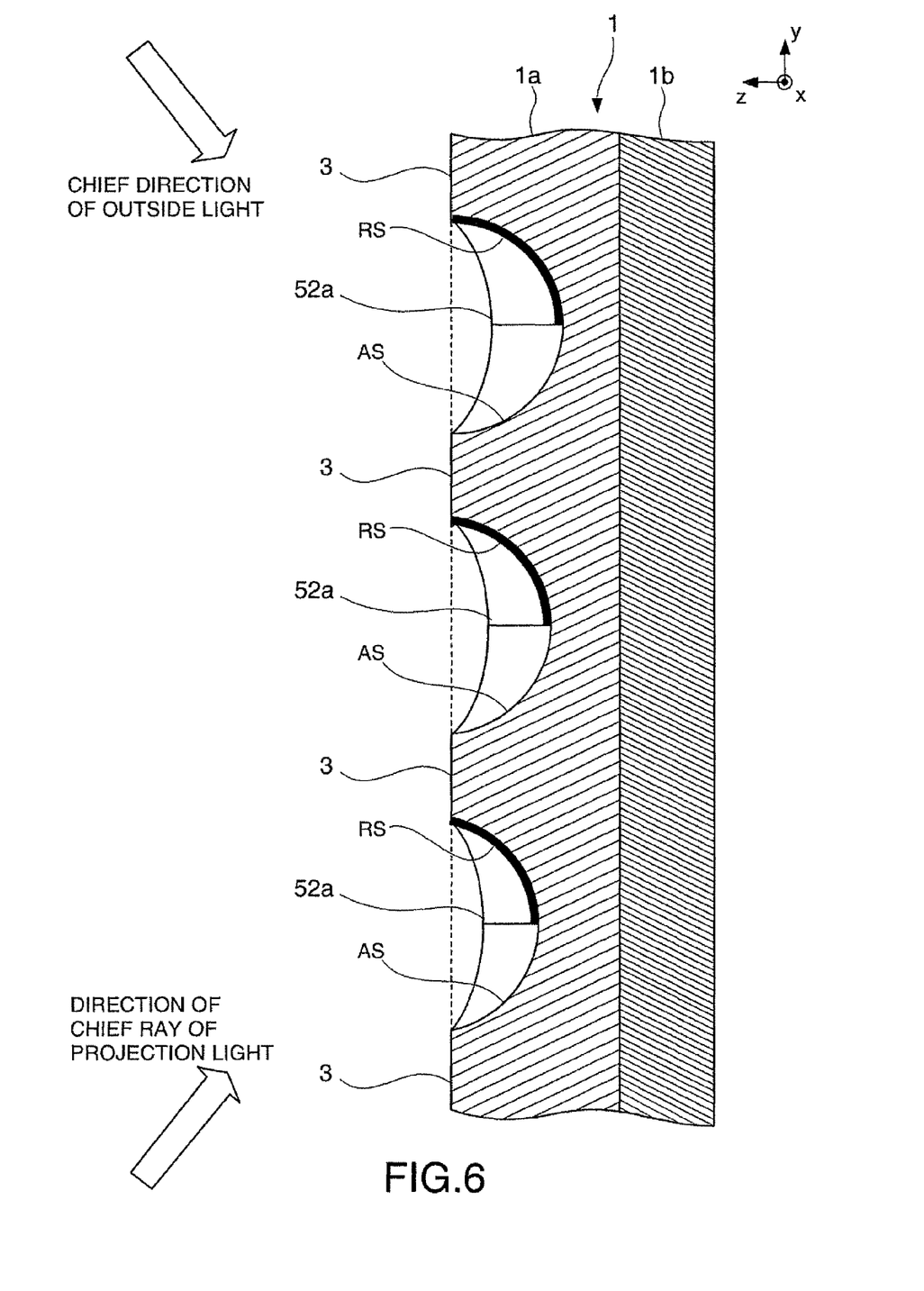
FIG. 6 is a view explaining another example of the screen.

FIG. 6 is a cross-sectional view explaining a modification example of the screen 10 shown in FIG. 1, FIG. 2 and the like. In this case, a number of concave portions 52a having a concave shape in a receding manner at the surface of the screen substrate 1 are formed as three-dimensional portions. Each concave portion 52a has a hemispherical surface. The concave portions 52a as a whole are two-dimensionally arranged in the x-direction which is the first direction and in the y-direction which is the second direction in the same pattern as FIG. 1A. Specifically, concave portions 52a adjacent in the x-direction contact one another to form the same group and the concave portions 52a adjacent in the y-direction are apart from one another to form different groups. In each concave portion 52a. the light reflection surface RS is provided at the upper side, facing projection light from below, and the light absorption surface AS is provided at the lower side, facing outside light from above. The vicinity above and below the concave portions 52a is the flat portion 3, absorbing outside light and the like.

In the case of a screen shown in FIG. 6, an upper side of the concave portion 52a is formed to be relatively deep and a lower side of the concave portion 52a is formed to be relatively shallow. As a result, at the upper side in which an incident angle of a chief ray of the projection light PL with respect to the screen substrate 1 is large, a folding angle of the ray according to the concave portion 52a becomes large, and at the lower side in which the incident angle of the chief ray of the projection light PL with respect to the screen substrate 1 is small, the folding angle of the ray according the concave portion 52a becomes small. Accordingly, at both upper and lower areas in the screen, the projection light can be reflected in the front direction efficiently. Also concerning the screen shown in FIG. 2, protrusions 2a at the upper side are allowed to be relatively high, and protrusions 2a at the lower side are allowed to be relatively low, thereby reflecting projection light at the front direction efficiently at both upper and lower areas in the screen.

The manufacture of the screen shown in FIG. 6 will be explained. For example, a mold corresponding to the shape of the concave portion 52a is manufactured, and a raw material such as thermoplastic resin or light cured resin is molded by using the mold, or press-processing is performed with respect to a raw material of a sheet state such as resin. Accordingly, a number of concave surfaces corresponding to the concave portions 52a can be formed in a desired pattern on the screen substrate 1. In addition, light reflection surfaces RS on the concave portions 52a are formed by depositing, for example, aluminum metal as a reflection material at specific regions of the concave surfaces formed as described above, or by spraying a reflection material by a spray from a specific direction. In the example, the screen substrate 1 includes a main body portion 1a on which the concave portions 52a are formed and a base portion 1b supporting the main body portion 1a. The base portion 1b is attached on the reverse surface side of the main body portion 1a after the concave portions 52a are formed by molding and the like for the purpose of reinforcement.

Figure 7:
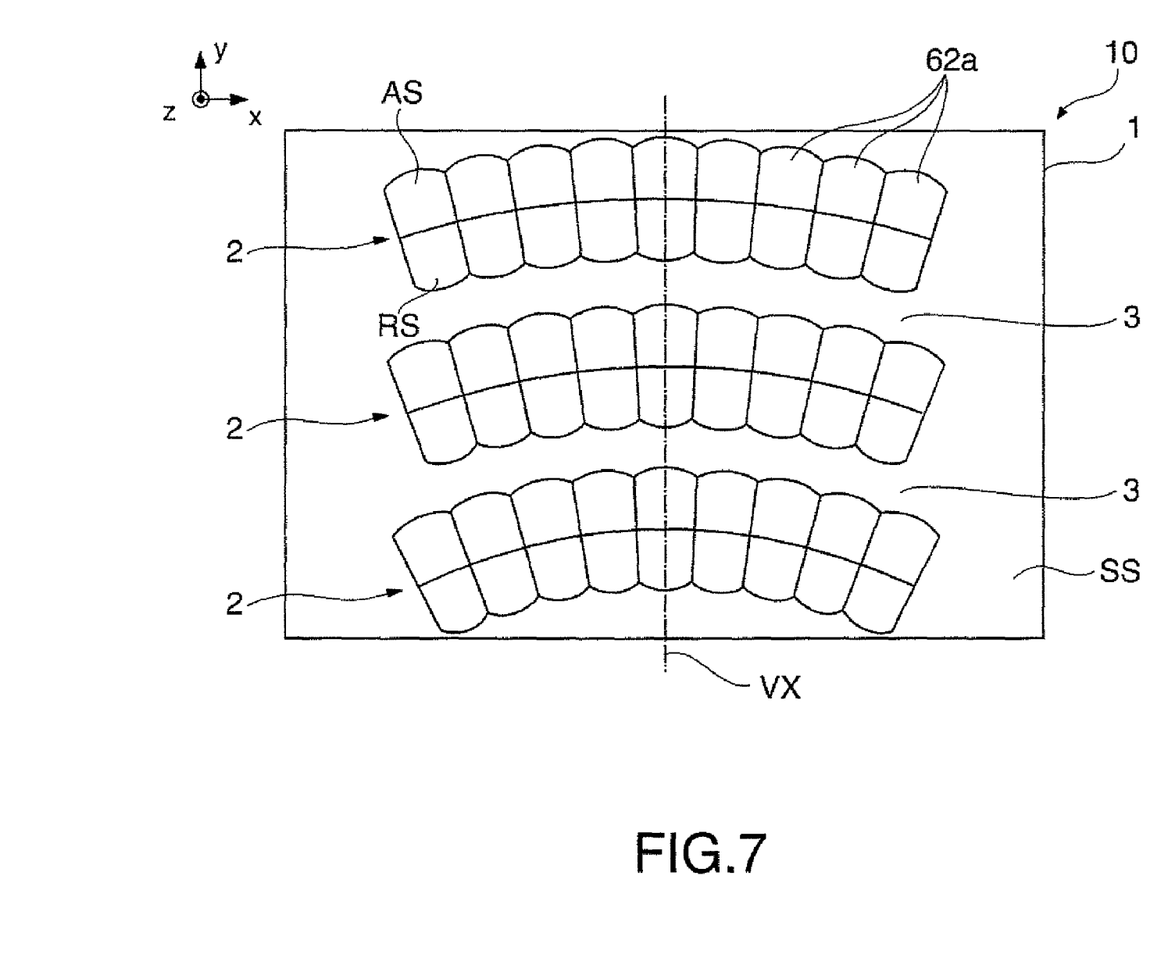
FIG. 7 is a view explaining another example of the screen.

FIG. 7 is a front view explaining a modification example of the screen 10 shown in FIG. 1A to FIG. 1C and the like. In this case, a group 2 formed in an arc shape which is convex at the top side are arranged symmetrically, sandwiching a vertical axis VX extending in the y-direction through the center of the screen 10. Further, a number of groups 2 are arranged in the vertical y-direction in parallel. Adjacent protrusions 62a in each group 2 contact one another, and adjacent groups 2 are apart from one another. The arc of each group 2 is formed concentrically.

When the group 2 is formed in an arc shape as described above, the direction in which the group 2 extends is allowed to be vertical to the chief ray of the projection light which is incident to respective points at the screen 10.

In the case of the screen 10 shown in FIG. 7, plural groups 2 are concentrically arranged, however, it is also preferable that a number of groups 2 having the same shape whose curvature corresponds to one another are arranged in the y-direction, or that each group 2 is divided into plural blocks in the same arc state. It is not necessary that the group 2 is formed by the protrusions 62a but it can be formed by concave portions 52a shown in FIG. 6. Furthermore, it is preferable that both convex groups 2 and concave groups 2 can be mixed, and that protrusions 62a and concave portions 52a are mixed in a single group 2. Specifically, for example, it is possible that the protrusions 62a and the concave portions 52a can be arranged alternately in the x-direction.

Figure 8:
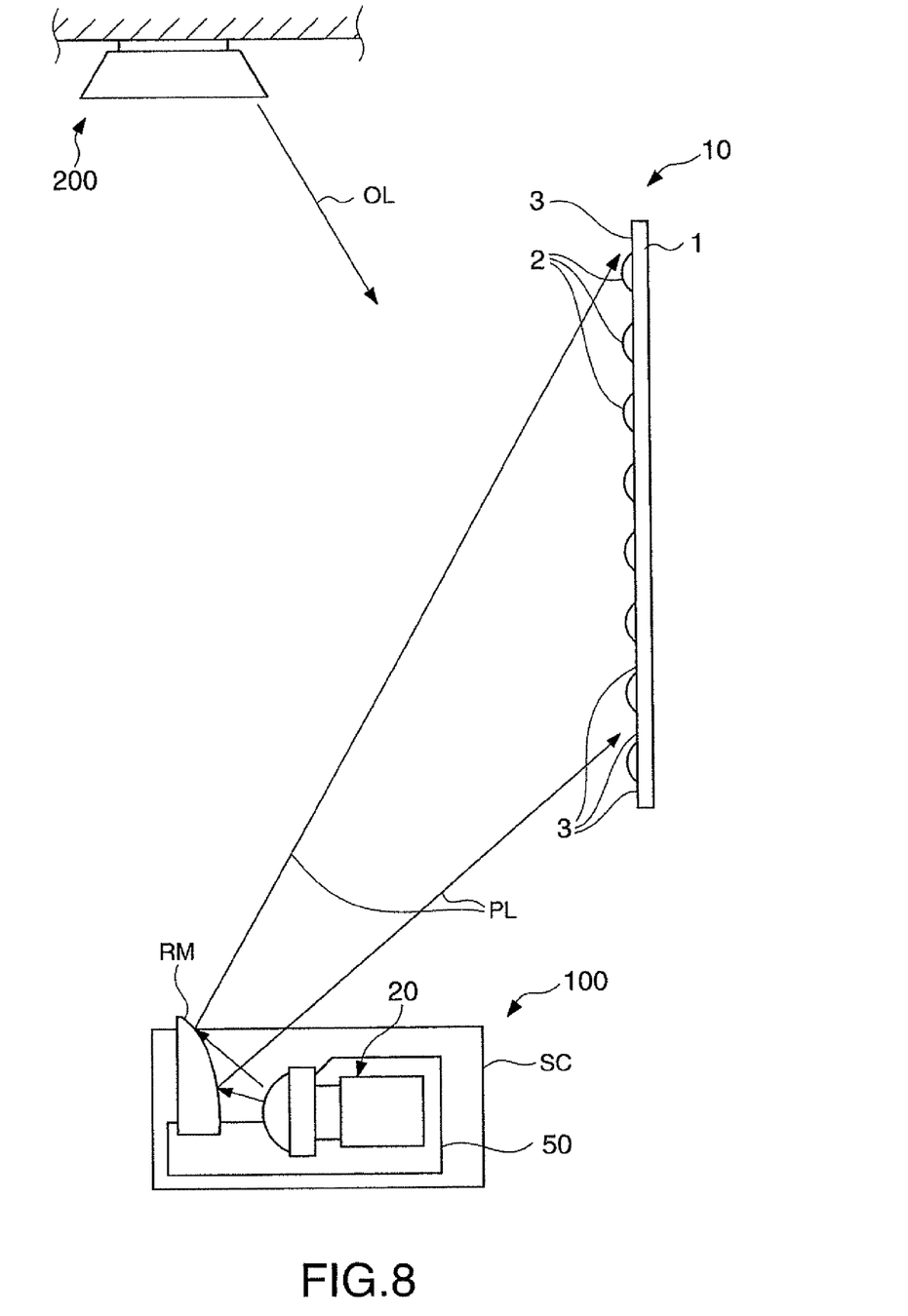
FIG. 8 is a schematic view concerning projection to the screen by a projector.

FIG. 8 is a view showing a using example of the screen 10 according to the embodiment in the case that a projector is used as a projection apparatus. In FIG. 8, a projector 100 includes a projector body 50, a projection lens 20 and a reflection mirror RM. Respective mechanisms of the projector 100 are housed in a casing SC. In this case, as an installation environment of the screen 10 and the projector 100, illumination by outside light OL from above is performed by an illumination apparatus 200 hung from the ceiling in the room, and the projector 100 performs projection from the lower direction of the screen.

Image light formed by control in the projector body 50 is emitted from the projection lens 20, and further, emitted as the projection light PL from the projector 100 in a state with a desired angle by the reflection at the reflection mirror RM. Therefore, in this case, the projector 100 performs oblique projection in a state in which the chief ray XL of the projection light PL is inclined with respect to a normal line of the screen 10. The projection light PL projected on the screen 10 is reflected by respective protrusions 2 as described above. At this time, as described above, the surface of the screen 10 is formed corresponding to the projection angle of the projection light PL, therefore, an image to be projected will be the bright one in which the decrease of the front gain is suppressed. In addition, the outside light OL from above is appropriately absorbed on the screen 10, therefore, contrast is improved even in the room in which illumination is performed brightly by the outside light OL.

The invention is not limited to the above embodiment but can be performed in various manners within a range not departing from the gist thereof, and for example, the following modification can be considered.

In the screen 10 in the embodiment, the first direction is the horizontal direction "x", however, the invention is not limited to this. For example, in the above embodiment, the direction of the chief ray XL with respect to the projection light PL is from below in consideration of the using environment of a common projection apparatus and the like, and the first direction is the horizontal direction according to this. However, in the case that the projection light PL is not from below, it is preferable that the first direction of the screen is a different direction. Specifically, for example, when the projection from the projector is performed from the lateral direction of the screen, the first direction can be the vertical direction. In addition, for example, it is also preferable that the first direction is determined by counting not only the direction of the chief ray XL with respect to the projection light PL but also both the direction of the chief ray XL with respect to the projection light PL and the chief direction of outside light. For example, when the projection from the projector is from the lateral side of the screen and the outside light such as illumination light is from above, the first direction can be an intermediate direction (for example, oblique 45-degrees direction).

Further, in the screen 10 of the above embodiment, the three-dimensional portions such as the protrusions 62a or the concave portions 52a forming the group 2 have a concavo-convex shape having hemispherical curved surface, however, it is also preferable that the three-dimensional portion of the invention can be a concavo-convex shave of a polyhedron including flat surfaces, not limited to the hemispherical concavo-convex shape.

Further, in the screen 10 of the above embodiment, plural protrusions 2a contact so as to overlap one another in the x-direction in each group 2, plural groups 2 are arranged apart from one another in the y-direction, and the flat portion 3 is formed between plural groups 2, however, it is not always necessary to provide the flat portion. That is, when the occupation rate of protrusions 2a or concave portions 52a is higher in the x-direction than in the y-direction, it is preferable that all protrusions 2a and concave portions 52a contact one another without the flat portion 3.

Figure 9A:
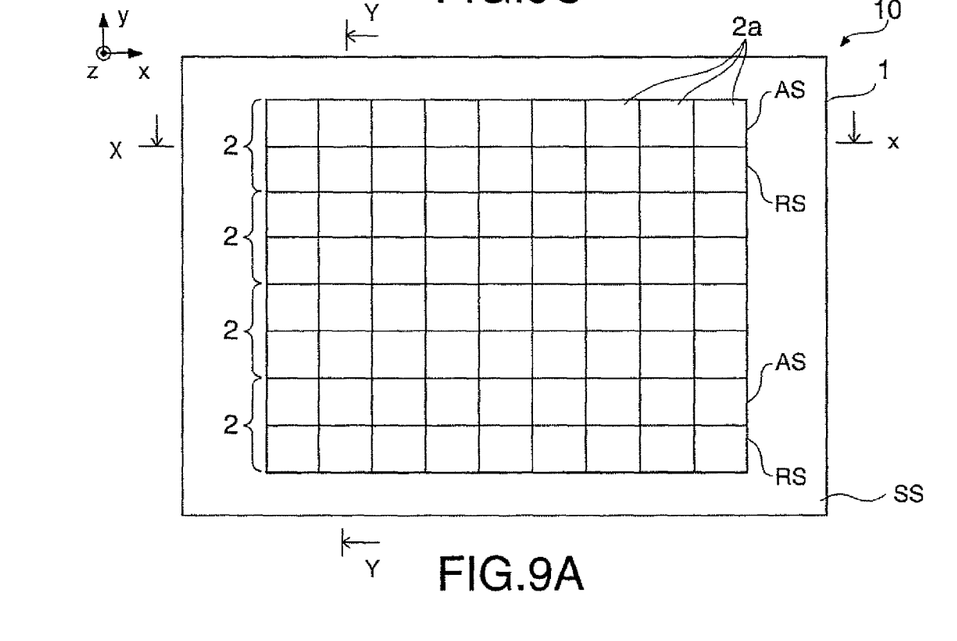
FIG. 9A to FIG. 9C are views explaining a screen of a modification example.
Figure 9B:
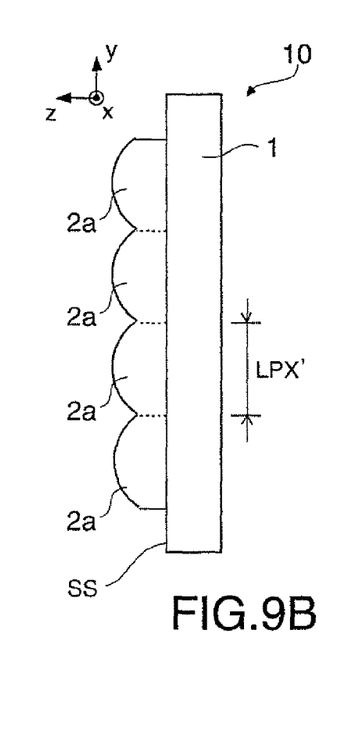
Figure 9C:
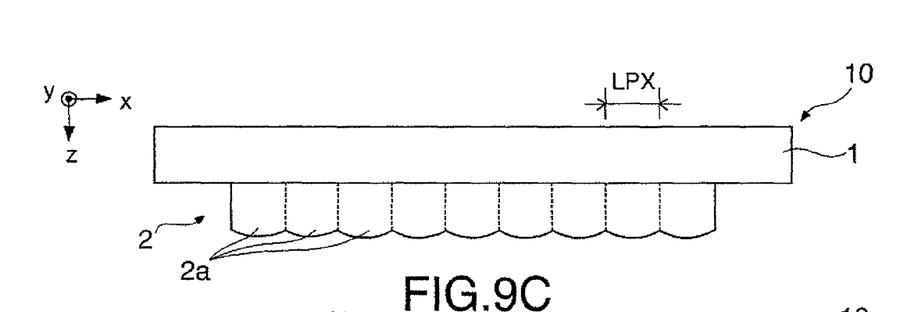

Hereinafter, a modification example in which the flat portion 3 is omitted in the screen 10 shown in FIGS. 1, 2 and the like will be explained specifically. FIG. 9A, FIG. 9B and FIG. 9C are a front view, a side cross-sectional view and a plan cross-sectional view explaining the modification example. In this case, a number of groups 2 extending in the x-direction are arranged closely without gaps in the y-direction, and the flat portion 3 as shown in FIG. 1A to FIG. 1C does not exist. However, a width LPY' in a cross section of each protrusion 2a in a Y-Y side cross-section is set to be, for example, twice as large as a width LPX of a cross section of a each protrusion 2a in a X-X plan cross-section. That is, the number of protrusions 2a at each unit length in the first direction corresponding to the x-direction (density) 1/LPX is sufficiently larger than the number of protrusions 2a at each unit length in the second direction corresponding to the y-direction (density) 1/LPY', accordingly, projection light from below can be efficiently reflected at the front of the screen 10 as well as the decrease of the front gain can be suppressed, as a result, an image can be brightly displayed.

In the above modification example, it is also preferable that all or part of the group 2 can be formed by concave portions 52a as shown in FIG. 6, instead of protrusions 2a.

Furthermore, it is possible to form the screen 10 by optionally combining more than two kinds of protrusions 2a and concave portions 52a having different shapes or arrangements included in the embodiment.

The entire disclosure of Japanese Patent Application Nos. 2007-189156. filed Jul. 20, 2007 and 2008-144381. filed Jun. 2, 2008 are expressly incorporated by reference herein.

What is claimed is:

1. A screen, comprising:
   plural three-dimensional portions having a concave shape arranged at a front surface side of a screen substrate;
   wherein the three-dimensional portions are disposed so that the number of the three-dimensional portions provided in a range of a given length along a first direction on the screen substrate which is determined corresponding to at least either one of a direction of a chief ray and a chief direction of outside light is larger than the number of three-dimensional portions provided in a range of the given length along a second direction crossing the first direction, wherein the plural three-dimensional portions are arranged so that at least two three-dimensional portions of the three-dimensional portions provided in the range of the given length along the first direction contact each other, wherein
   the first direction is a direction of an intersection line between a surface vertical to the chief ray of the projection light and a screen surface;
   the plural three-dimensional portions include a light reflection surface and a light absorption surface, a boundary between the light reflection surface and the light absorption surface is parallel to the first direction.

2. The screen according to claim 1,
   wherein each of the plural three-dimensional portions is a concave portion having an approximately hemispherical shape receding from the surface of the screen substrate.

3. The screen according to claim 1,
   wherein at least part of the plural three-dimensional portions forms a group in which basic shapes are connected one another by being overlapped.

4. The screen according to claim 1,
   wherein at least part of the plural three-dimensional portions is arranged so that adjacent three-dimensional portions contact one another in the same line along the first direction.

5. The screen according to claim 1,
   wherein at least parts of the plural three-dimensional portions are apart from one another for a given interval with respect to the second direction.

6. The screen according to claim 1,
   wherein the first direction is a horizontal direction.

7. The screen according to claim 1,
   wherein the second direction is a vertical direction.

8. The screen according to claim 1,
   wherein the first direction and the second direction cross orthogonally.

9. The screen according to claim 1,
   wherein the plural three-dimensional portions include the light absorption surface in the vicinity of the light reflection surface.

10. The screen according to claim 1,
    wherein a flat portion is provided between the plural three-dimensional portions on the front surface side of the screen substrate, and
    wherein the flat portion includes an absorption surface of light.

11. A screen, comprising:
    plural three-dimensional portions having a convex shape arranged at a front surface side on a screen substrate; and
    wherein the three-dimensional portions are disposed so that the number of the three-dimensional portions provided in a range of a given length along a first direction on the screen substrate which is determined corresponding to at least either one of a direction of a chief ray and a chief direction of outside light is larger than the number of three-dimensional portions provided in a range of the given length along a second direction crossing the first direction, wherein at least two three-dimensional portions of the three-dimensional portions provided in a range of a given length along the first direction are arranged so as to contact each other, wherein
    the first direction is a direction of an intersection line between a surface vertical to the chief ray of the projection light and a screen surface;
    the plural three-dimensional portions include a light reflection surface and a light absorption surface, a boundary between the light reflection surface and the light absorption surface is parallel to the first direction.

12. The screen according to claim 11,
    wherein each of the plural three-dimensional portions is a protrusion having an approximately hemispherical shape protruding from the surface of the screen substrate.

* * * * *